No. 663,575. Patented Dec. 11, 1900.
R. W. KNAPP.
WATER TUBE BOILER.
(Application filed Mar. 22, 1900.)

(No Model.) 5 Sheets—Sheet 1.

Witnesses.
Harry Kilgord.
Robert Otto.

Inventor.
Roland W. Knapp.
By his Attorneys,
Williamson & Merchant

No. 663,575. Patented Dec. 11, 1900.
R. W. KNAPP.
WATER TUBE BOILER.
(Application filed Mar. 22, 1900.)

(No Model.) 5 Sheets—Sheet 2.

Witnesses.
Harry Kilgore.
Robert Otto.

Inventor.
Roland W. Knapp.
By his Attorneys,
Williamson & Merchant

No. 663,575. Patented Dec. 11, 1900.
R. W. KNAPP.
WATER TUBE BOILER.
(Application filed Mar. 22, 1900.)

(No Model.) 5 Sheets—Sheet 3.

Witnesses.
Harry Kilgus.
Robert Otto.

Inventor.
Roland W. Knapp,
By his Attorneys,
Williamson & Merchant

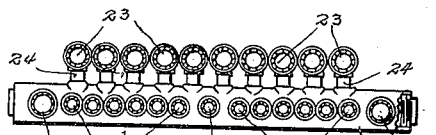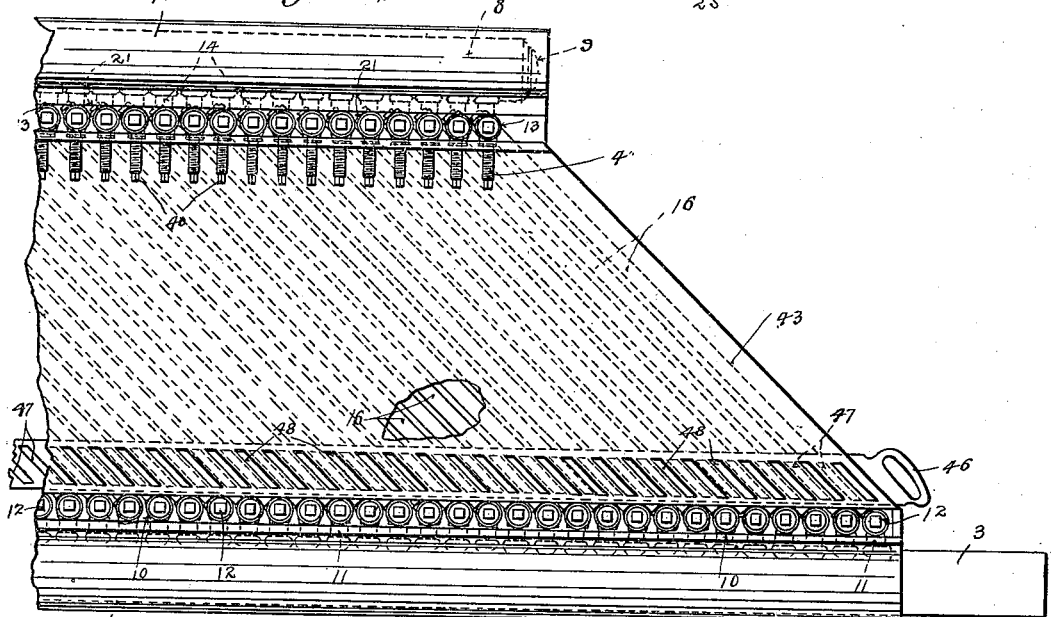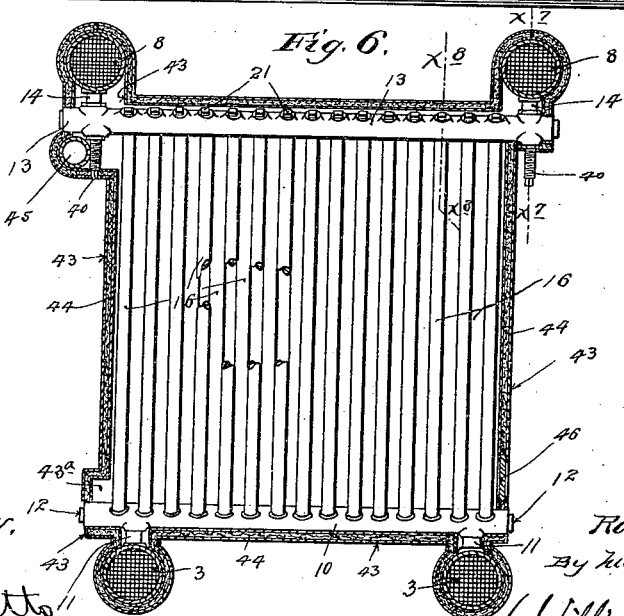

No. 663,575. Patented Dec. 11, 1900.
R. W. KNAPP.
WATER TUBE BOILER.
(Application filed Mar. 22, 1900.)
(No Model.) 5 Sheets—Sheet 5.
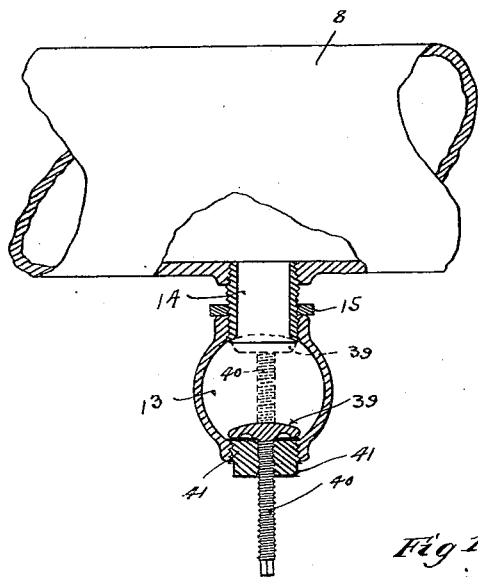
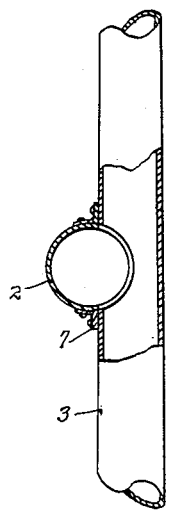
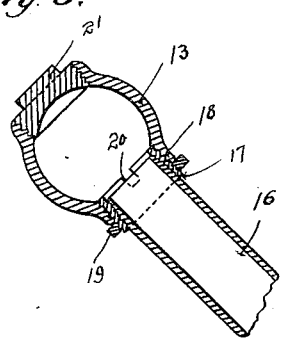
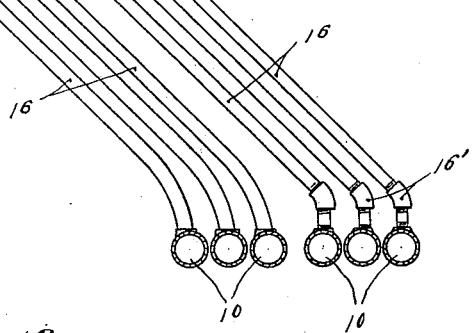
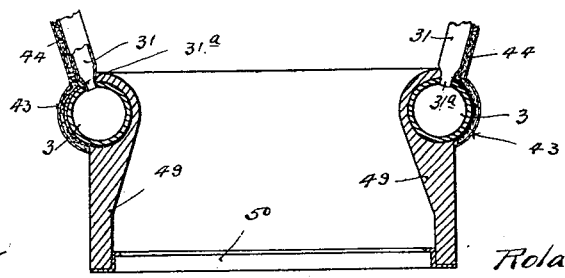
Witnesses.
Harry Kilgore.
Robert Otto.
Inventor.
Roland W. Knapp
By his Attorneys.
Williamson Merchant

UNITED STATES PATENT OFFICE.

ROLAND W. KNAPP, OF MINNEAPOLIS, MINNESOTA.

WATER-TUBE BOILER.

SPECIFICATION forming part of Letters Patent No. 663,575, dated December 11, 1900.

Application filed March 22, 1900. Serial No. 9,703. (No model.)

*To all whom it may concern:*

Be it known that I, ROLAND W. KNAPP, a citizen of the United States, residing at Minneapolis, in the county of Hennepin and State of Minnesota, have invented certain new and useful Improvements in Water-Tube Boilers; and I do hereby declare the following to be a full, clear, and exact description of the invention, such as will enable others skilled in the art to which it appertains to make and use the same.

My present invention has for its object to improve the construction of so-called "water-tube" boilers; and to this end it consists of the novel devices and combinations of devices hereinafter described, and defined in the claims.

This invention has certain features which are in common with the construction set forth in my pending application, Serial No. 723,646, filed July 13, 1899, entitled "Water-tube boilers;" but the especial object of this invention is to improve the construction of that type of boiler used in locomotives and traction-engines, but sometimes, however, also in stationary engines.

The invention is illustrated in the accompanying drawings, wherein like characters indicate like parts throughout the several views.

Figure 1:
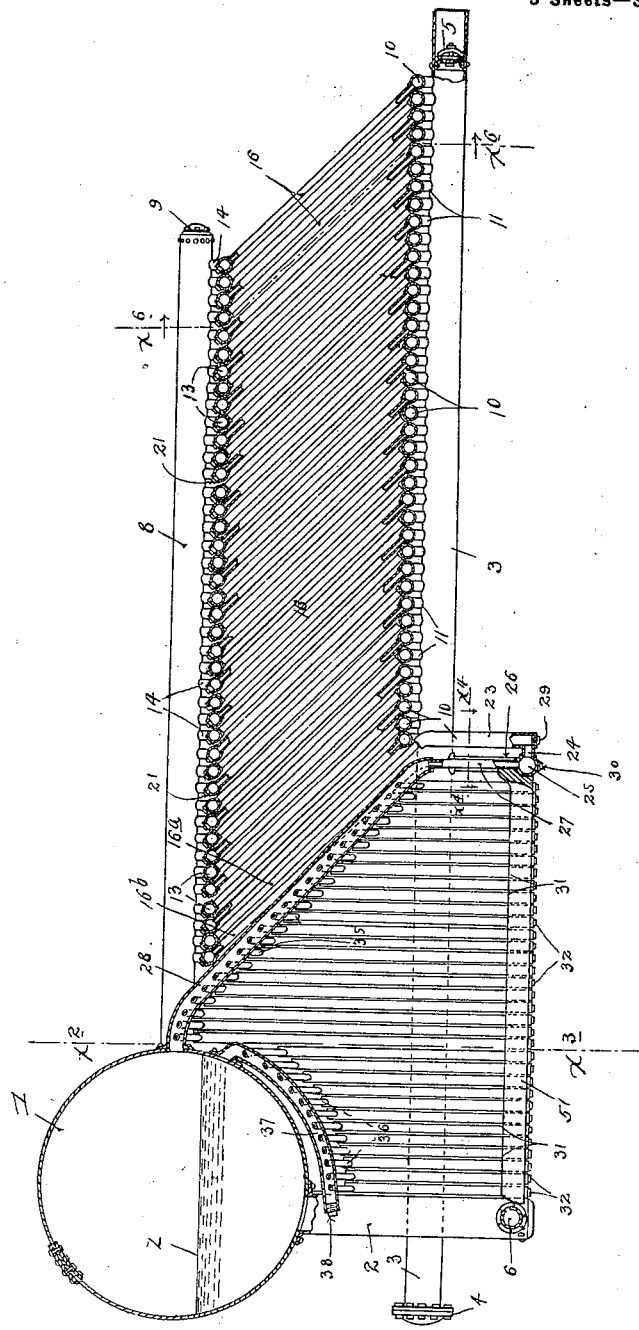
Figure 2:
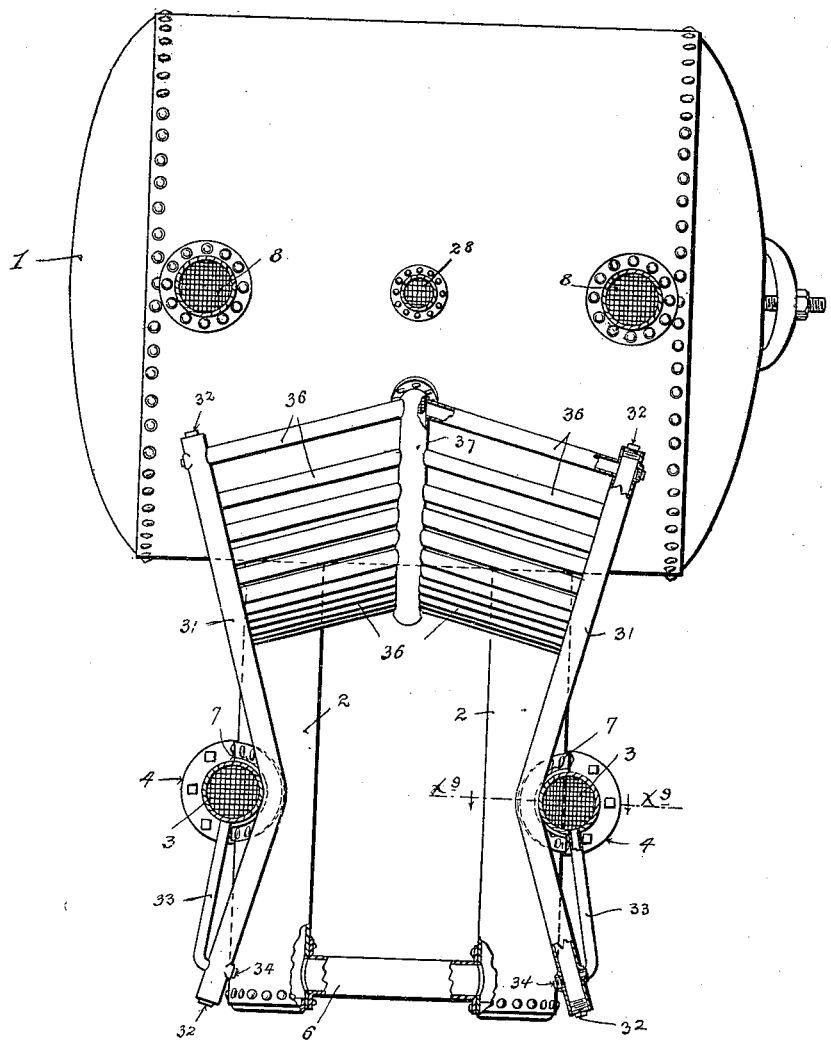
Figure 3:
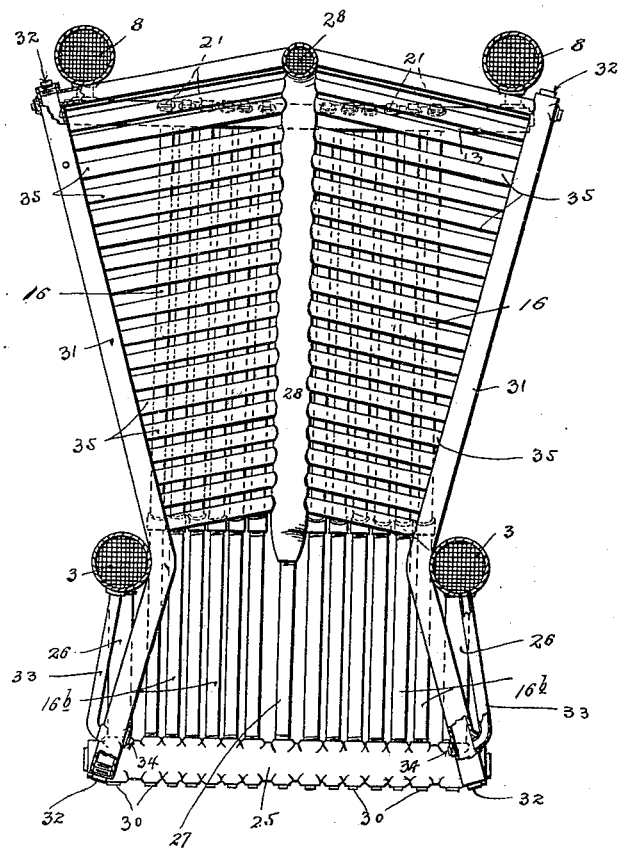

Figure 1 is a longitudinal vertical section taken centrally through a boiler constructed in accordance with my invention, certain parts being removed. Fig. 2 is a transverse vertical section taken approximately on the line $x^2 x^3$ of Fig. 1 looking toward the rear of the boiler. Fig. 3 is also a transverse vertical section taken on the line $x^2 x^3$ of Fig. 1, but looking toward the front of the boiler. Fig. 4 is a detail and horizontal section on the line $x^4 x^4$ of Fig. 1. Fig. 5 is a view in side elevation of a portion of the boiler, some parts being broken away and the boiler being viewed from the same side as in Fig. 1. Fig. 6 is a transverse section taken on the irregular line $x^6 x^6$ of Fig. 1. Fig. 7 is a detail, partly in side elevation and partly in section, on the line $x^7 x^7$ of Fig. 6. Fig. 8 is a detail in section on the line $x^8 x^8$ of Fig. 6. Fig. 9 is a detail in horizontal section on the line $x^9 x^9$ of Fig. 2. Figs. 10 and 11 illustrate a modified construction of the generating-tubes, and Fig. 12 is a detail in transverse vertical section illustrating a modified form of the lower portion of the fire-box.

The invention will now be specifically described in what I consider the best form thereof.

The numeral 1 indicates the primary drum or steam-boiler, which is preferably, although not necessarily, extended transversely of the boiler and of the engine. This drum 1 will contain water approximately to the level indicated at $z$, and it is provided at approximately its lower portion with a pair of depending water-legs or large tubes 2, which may appropriately be termed the "downflow-columns." These downflow-columns open directly each into one of a pair of long horizontally-extended water-distribution drums 3, which, as shown, are closed at their rear ends by caps 4 and at their forward ends by removable plugs or hand-hole plates 5. The downflow-columns 2 are connected at their extreme lower portions by a connecting-tube 6, which permits free circulation between the said columns and braces the same. This connecting-tube, while desirable, may of course be dispensed with. Fig. 9 best illustrates the manner in which the downflow-columns 2 open into the distribution-drums 3, and it will there be noted that one of the said tubular parts is notched into the other and that the said parts are connected by an annular saddle 7.

A pair of horizontally-extended steam-return drums 8 open into the primary drum 1, preferably above the water-level thereof and near the ends of the said drum 1. These return-drums 8 are in the form of long and large tubes that extend parallel, or approximately so, to each other and to the distribution-drums 3, and they are preferably closed at their forward ends by removable heads or caps 9. A transversely and horizontally extended series of manifold-tubes 10 extend in a plane just above the distribution-drums 3, each manifold-tube being connected at or near its ends to the said drums 3 by means of short vertical pipe-sections 11, as best shown in Figs. 1 and 6. These manifold-tubes 10 are preferably provided with removable end plugs 12, that adapt them to be cleaned when said plugs are removed. A corresponding series of manifold-tubes 13 are extended transversely in a horizontal plane just below the return-drums 8, each manifold-tube being connected at or near its ends to the said tubes 8 by short pipe-sections 14. (Best shown in Figs. 1, 6, and 7.) As shown in Fig. 7, the short pipe-sections or thimbles 14 are screw-threaded both into the manifold-tubes 13 and into the return-tubes 8; but it will of course be understood that they might be connected in any other suitable way. A jam-nut 15 is shown as working on each thimble 14 for engagement with the adjacent nipple portion of the manifold-tube 13. The corresponding manifold-tubes 10 and 13 are connected each by a transversely-spaced series of generating-tubes 16, that may be connected thereto in any suitable way, but are advisably connected substantially as shown in Fig. 8, wherein the numeral 17 indicates an internally and externally screw-threaded bushing 17, which is screwed into a nipple portion 18 of the corresponding manifold-tube 13 and is provided with a lock-nut 19 for securing it where set and assisting in forming a tight joint with the manifold-tube. The upper ends of the generating-tubes 16 are screwed into the bushings 17, and the said bushings 17 are preferably provided with notches 20, by means of which they may be turned by a wrench or instrument which will fit the same. The manifold-tube 13 is further provided at points diametrically opposite to the upper ends of the tubes 16 with removable plugs 21, screw-threaded thereinto and which when removed permit the tubes 16 to be cleaned and also permit the so-called "bushings" 17 to be inserted and adjusted. The connection between the lower ends of the generating-tube 16 and the lower manifold-tubes 10 may be the same as illustrated in Fig. 8.

The generating-tubes 16 are preferably inclined downward in the direction of the draft, and hence the manifold-tubes 10 are extended farther forward than are the manifold-tubes 13. This feature, however, relates particularly to my prior application and is therein broadly claimed. Hence so far as many of the features of my present invention are concerned these generating-tubes may be either inclined or perpendicular, although they are advisably arranged as shown, and this for an additional reason that the generating-tubes when inclined make better connection with the inclined tubes of the fire-box section of the boiler, as will hereinafter appear.

In Figs. 10 and 11 the generating-tubes 16 are shown as bent or crooked at the lower portions. This construction has the advantage that greater space is left between the lower ends of the generating-tubes, thus permitting the cinders to be more readily cleaned from between them and also permits a greater unevenness of expansion. In Fig. 10 the said tubes 16 are shown simply as if bent, while in Fig. 11 they are shown as formed by sections connected by elbows 16'.

The next to the innermost manifold-tube 13 has a series of inclined generating-tubes 16ª, which instead of connecting to a corresponding manifold-tube 10 connect one to each of a series of vertically-depending and closely-positioned enlarged tube extensions 23, that form a wall for that portion of the fire-box which depends below the manifold-tubes 10, as best shown in Figs. 1 and 4. The tube extensions 23 are connected by short sections or thimbles 24 to a transversely-extended manifold-tube 25. The innermost manifold-tube 13 is connected by a series of inclined generating-tubes 16ᵇ, the lower portions of which are turned vertically downward and connected to the manifold-tubes 25. The manifold-tube 25 for the sake of distinction may be termed the "grate-manifold," and at its outer ends it is connected to the distribution-drums 3 by supplemental downflow columns or tubes 26. At its central portion the grate-manifold 25 has a short vertical tube 27, that connects at its upper end to the lower end of an inclined return-manifold 28 of much larger diameter than the said tube 27. As will be noted by reference to Figs. 3 and 4, the tubes 16ᵇ and 27 are of such diameter and are so spaced that the products of combustion freely pass between them and into contact with the wall-forming tubes or tube extensions 23. The said tube extensions 23, it will also be noted, are provided with removable screw-threaded plugs 29, which when removed permit the said tubes to be cleaned out. It will also be noted by reference particularly to Fig. 3 that the manifold-tube 25 is provided immediately below the tubes 16ᵇ, 27, and 26 with removable screw-threaded plugs 30, which when removed permit the said tubes to be cleaned.

The sides of the fire-box are formed by closely-positioned tubes 31, which while not truly vertical are for the sake of definition termed "upright" tubes, inasmuch as their general direction is upward and downward. These upright wall-tubes 31 vary in length to follow approximately the lines of the inclined return-manifold 28 and the under surface of the primary drum 1, and both at their upper and lower ends they are preferably provided with screw-threaded plugs 32, which permit them to be readily cleaned. In this preferred construction the wall-tubes 31 flare apart at their upper portions and again at their lower portions, the said tubes being bent inward, so as to pass within or between the distribution-drums 3. This is done to increase the capacity of the fire-box and to afford as wide a grate as possible without widening the boiler beyond predetermined fixed limits for locomotive construction. Short downflow-tubes 33 connect each wall-tube 31 with the distribution-drum 3 on the corresponding side of the boiler, and, as shown, said tubes 31 have removable plugs 34 opposite to the lower open ends of said tubes 33 to permit said tubes 33 to be cleaned or removed. Those wall-tubes 31, which extend within the longitudinal space covered by the centrally-located and inclined return-manifold 28 are connected to the said manifold at their upper ends by inclined branch tubes 35, which are of such diameter that they leave spaces between them for the free passage of the products of combustion to the generating-tubes 16. Those wall-tubes 31 which are extended under the primary boiler 1 are in a similar manner connected at their upper ends by contracted and inclined branch sections 36 to a centrally-located return-manifold 37, the upper end of which opens into the primary drum 1, as shown, below the water-level thereof, same being curved to approximately follow the under surface of the said drum 1 and being preferably provided at its lower end with a removable plug 38, which permits it to be cleaned.

Returning now to the construction illustrated in Fig. 7, the numeral 39 indicates a plug-valve or valve-head which is adapted to closely engage the lower end of the thimble or pipe-section 14 to cut off circulation through the said thimble and through the manifold 13. This valve 39 has a stem 40, which works with screw-threaded engagement through a plug 41, which is screw-threaded into the manifold 13. The plug 41 is of such diameter that when it is removed the valve or head 39 may be passed through the seat therefor in the manifold. In Fig. 7 the dotted lines indicate the valve as closed and the full lines as open.

Figs. 5 and 6 illustrate to some extent the manner of incasing the tubular parts of the boiler. This casing would preferably be formed by sheet-metal plates 43, having pressed between them an asbestos or non-conducting packing 44. The case will be formed in sections of the proper size to permit ready removal and application thereof.

In Fig. 6 the numeral 45 indicates a steam-delivery pipe which will extend from the primary drum 1 to the ordinary point for the proper supply of the steam to the steam-chests of the engine. This pipe, however, has nothing to do with my present invention and may be applied and extended as desired.

In Figs. 5 and 6 the numeral 46 indicates a flat bar which is provided with a plurality of inclined slots 47, spaced apart to correspond to the spaces between the series of generating-tubes 16. This slotted bar 46 is mounted to work in a suitable seat formed between the plates of one of the side sections of the casing 43, close to the lower ends of the generating-tubes 16, and the adjacent plates or sheets 43 are provided with inclined slots 48, that are adapted to be opened and closed by the endwise sliding movement of the damper-bar 46. The said damper-bar may be extended at one end and provided with a handpiece, or it may be otherwise provided with means for moving it. When the said bar is moved to open the slots 48 in the casing, a poker or other device may be passed through the said slots and between the generating-tubes 16 to remove cinders or soot which may have been deposited at the lower ends of the said generating-tubes. By means of a poker inserted through the registered slots of the case and of the damper-bar the cinders may be forced into a longitudinally-bulged channel $43^a$, formed in the opposite side of the casing 43. From this channel $43^a$ the cinders may be forced longitudinally of the boiler by a suitable poker or tool. (Not shown.)

The circulation of the water and steam under the action of the heat from the combustion within the fire-box and within the horizontally-extended combustion-chamber formed between the manifold-tubes 10 and 13 will be substantially as follows: The cooler portions of the water from within the primary drum 1 flow downward through the downflow-columns 2 and from thence into the distributing-drums 3. From the distributing-drums a portion of the water will flow through the small downflow-tubes 33 into the lower ends of the wall-tubes 31, and from thence upward through the inclined branches 35 and 36 into the inclined return-manifolds 28 and 37, respectively, and from the said manifolds back into the drum 1. Also a portion of the water will flow from the distributing-drums 3, down through the supplemental downflow-columns 36, into the so-called "grate-manifold" 25, and from thence the main body passes upward through the tubes 23, $16^a$, and $16^b$ to the horizontal manifolds 13, and from thence through the steam-returning drums 8 to the primary boiler. A small amount of the water from the manifold 25, however, passes through the tube 27 to the lower end of the return-manifold 28, and from thence directly to the drum 1. The largest amount of the water from the distribution-drums 3, however, passes first through the short sections 11 to the lower manifolds 10, from thence through the numerous series of generating-tubes 16 to the upper manifold-tubes 13, thence through the short pipe-sections 14 into the steam-return drums 8, and from thence back to the primary drum 1.

With the above construction the heat from the products of combustion is at all points and at all sides brought directly into contact with generating-tubes of one form or the other, and thus great generating capacity is afforded. It has been noted that those generating-tubes which form the walls of the fire-box have direct returns to the primary drum 1, which returns are independent of the return-tubes for the generating-tubes 16. This is important for the reason that the most intense heat will be effective on the wall-tubes of the fire-box, and hence the circulation therethrough should and will be more rapid than through the tubes which are subjected to less heat.

The screw-threaded bushing 17 (illustrated in Fig. 8) enables a tight screw-threaded joint to be made between two tubular bodies, which cannot be rotated or turned one with respect to the other, and while the construction described, wherein the bushing is adjustable when the plug 21 is removed, is preferred the said bushing may, however, be adjusted from its outer end by a slight modification, and either form would be within the scope of my invention.

In the modified construction illustrated in Fig. 12 the wall-tubes 31 are cut shorter at their lower ends than in the above-described construction, and they are slightly contracted at their lower ends and directly connected to the water-distribution drums 3, as shown at 31ª. The lower portion of the fire-box is formed by a fire-brick-lined framework 49, to the lower portion of which a grate-supporting-flange 50 is secured.

In the construction illustrated in Figs. 1 to 6, inclusive, the grate (not shown) may be suitably supported from the so-called "grate-manifold" 30 and from the connecting-tube 6. In Fig. 1 the numeral 51 indicates fire brick or clay arranged to protect the extreme lower ends of the wall-tubes 31.

It will of course be understood that the invention above described is capable of many modifications. For instance, the water-distribution drums 3 at their rear ends might be bent downward and dropped to the level of the lower portion of the fire-box, and even this modification would be included within the expression as herein used—to wit, "approximately horizontally extended water-circulating drums having communication with the primary drum."

What I claim, and desire to secure by Letters Patent of the United States, is as follows:

1. In a boiler, the combination with a primary drum, of approximately parallel and horizontally-extended steam and water circulating drums communicating with said primary drum, two approximately parallel series of manifold-tubes communicating with said circulating-drums, and generating-tubes communicating with said manifold-tubes, substantially as described.

2. In a boiler the combination with a primary drum, of approximately parallel and horizontally-extended pairs of steam and water circulating drums communicating with said primary drum, a horizontal series of transversely-extended manifold-tubes connecting the pair of extended steam-drums, another horizontal series of transversely-extended manifold-tubes connecting said water-circulating drums, and series of generating-tubes connecting the corresponding upper and lower manifold-tubes, substantially as described.

3. In a boiler the combination with a primary drum, of a pair of approximately horizontal and parallel steam-return drums communicating with said primary drum, a pair of downflow-pipes depending from said primary drum, a pair of approximately horizontal and parallel water-distribution drums, a horizontal series of transversely-extended manifold-tubes connecting said pair of steam-return drums, another horizontal series of transversely-extended manifold-tubes connecting said pair of water-distribution drums, and the series of generating-tubes connecting said manifold-tubes, substantially as described.

4. In a boiler, the combination with a primary drum and a fire-box, of approximately parallel and horizontally-extended steam and water circulating drums communicating with said primary drum and projecting beyond said fire-box, two approximately parallel series of manifold-tubes communicating with said circulating-drums, and generating-tubes communicating with said manifold-tubes, substantially as described.

5. In a boiler, the combination with a fire-box having sides formed by closely-positioned wall-tubes, of a primary drum above said fire-box, approximately parallel and horizontally-extended steam and water circulating drums communicating with said primary drum and projecting beyond said fire-box, two approximately parallel series of manifold-tubes communicating with said circulating-drums, and generating-tubes communicating with said manifold-tubes, substantially as described.

6. In a boiler the combination with a primary drum, of approximately parallel and horizontally-extended steam-return and water-distribution drums communicating with said primary drum, an upper and lower horizontal series of transversely-extended manifold-tubes communicating respectively with said steam-return and water-distribution drums, the series of generating-tubes connecting said manifold-tubes and inclined downward in the direction of the draft, and a fire-box at the receiving end of the combustion-chamber formed between said manifold-tubes, comprising closely-positioned wall-tubes, an inclined return-manifold opening into said primary drum, communication between said wall-tubes and said water-distribution drums, and connections between said wall-tubes and said return-manifold, substantially as described.

7. The combination with the drum 1 with depending downflow-columns 2, horizontally-extended return steam-drums 8 and inclined return-manifolds 28 and 37, said parts opening into said drum 1, of the water-distribution drums 3 opening from said downflow-columns 2, the series of manifold-tubes 10 and 13 connecting respectively said distribution-drums 3 and return-drums 8, the series of inclined generating-tubes 16 connecting said manifold-tubes 10 and 13, the wall-forming tubes 31 communicating with said distribution-drums 3, and the inclined branch tubes 35 and 36 connecting the wall-tubes 31 with the return-manifolds 28 and 37 respectively, substantially as described.

8. The combination with a primary drum, of a fire-box, the sides of which are formed by closely-positioned wall-tubes, an inclined manifold-tube leading to said primary drum and connected with certain of said wall-tubes by branch tubes, said wall-tubes having communication at their lower portions with the lower portion of said primary drum, substantially as described.

9. The combination with a primary drum, of a fire-box the sides of which are formed by closely-positioned wall-tubes, and an inclined return manifold-tube leading to said primary drum and connected with said wall-tubes by transversely-extended and laterally-spaced branch tubes, said wall-tubes having also connections from their lower portions with the lower portion of said primary drum, substantially as described.

In testimony whereof I affix my signature in presence of two witnesses.

ROLAND W. KNAPP.

Witnesses:
ROBERT OTTO,
F. D. MERCHANT.